C. M. WILSON.
DUMP CAR.
APPLICATION FILED JAN. 23, 1920.

1,354,791.

Patented Oct. 5, 1920.
2 SHEETS—SHEET 1.

WITNESS:

INVENTOR
Charles M. Wilson
BY
Frank D. Busser
ATTORNEY.

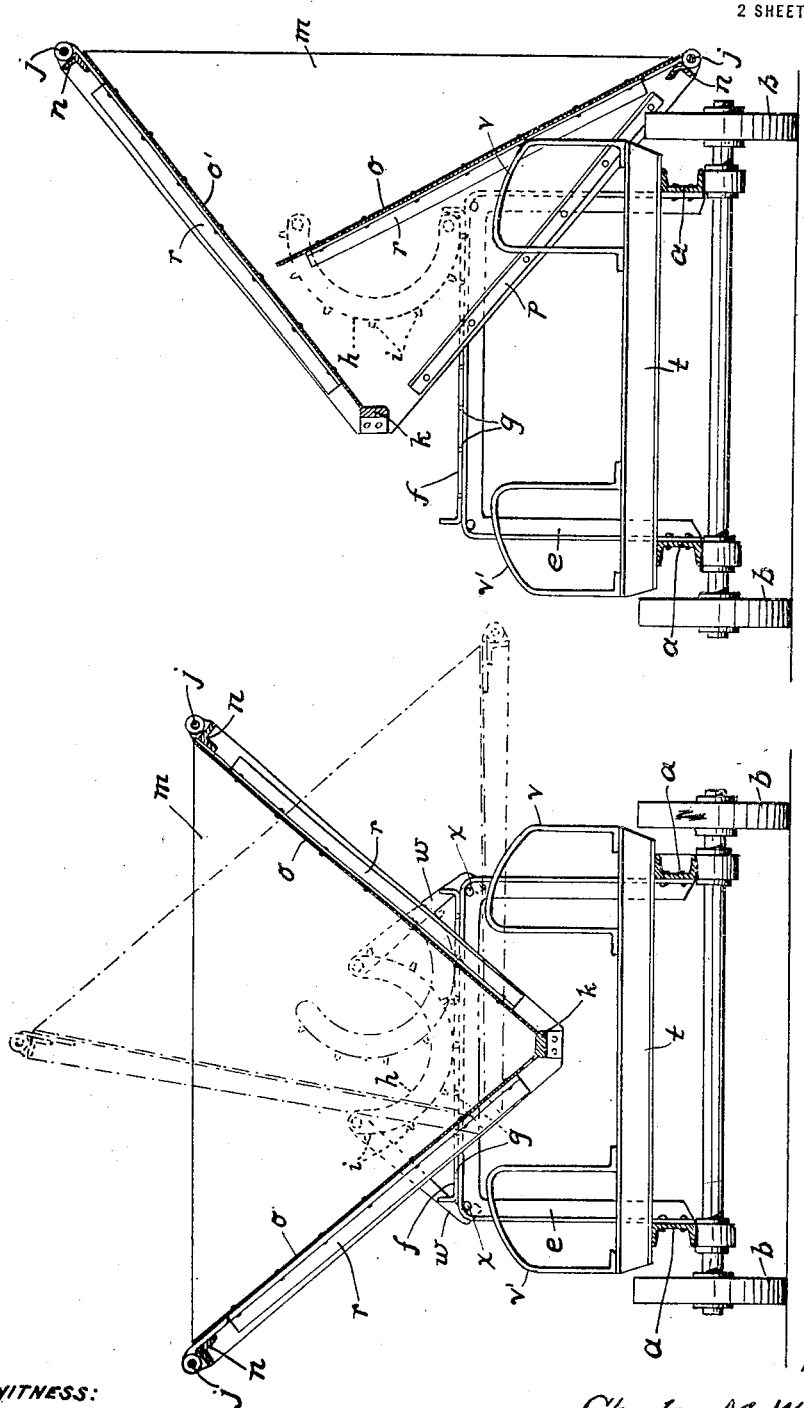

UNITED STATES PATENT OFFICE.

CHARLES M. WILSON, OF PHILADELPHIA, PENNSYLVANIA.

DUMP-CAR.

1,354,791. Specification of Letters Patent. Patented Oct. 5, 1920.

Application filed January 23, 1920. Serial No. 353,559.

*To all whom it may concern:*

Be it known that I, CHARLES M. WILSON, a citizen of the United States, residing at Philadelphia, county of Philadelphia, and State of Pennsylvania, have invented a new and useful Improvement in Dump-Cars, of which the following is a full, clear, and exact description, reference being had to the accompanying drawings, which form a part of this specification.

The object of my invention is to construct a dump car, operating on the side-discharge principle, so as to insure the complete ejection of material from the car.

It is known to mount a bin-shaped car body on a truck in such manner that the car may be swung laterally approximately ninety degrees, thereby causing the material to slide out over the top of one side of the car body. It is impracticable, however, to tilt the body so far over that the bottom side of the tilted car will occupy an angle sufficiently displaced from a horizontal plane as to insure the complete discharge of the material by gravity; and it is usually necessary to remove the residue clinging within the car by means of manually operated shovels.

In my invention, the construction of this type of car is so modified as to enable the bottom side of the tilted car to tilt beyond the position to which it would move if in fixed relation with the rest of the car body, to which end this side is hinged at what is normally the top of the car, and an abutment, preferably a cam, is mounted on the truck and engages the hinged side as the car body is tilted and moves it toward an upright position so as to afford a very steep slope for the material being discharged and thus insure its complete ejection. Practically, both sides of the car are hinged as described and an operating cam is mounted on the truck on each side of the car; one cam operating when the car body is tilted in one direction and the other cam operating when the car body is tilted in the opposite direction.

A preferred embodiment of the invention is shown in the accompanying drawings, wherein—

Fig. 2 is a cross-section on the line 2—2 of Fig. 1, the loading position of the car body being shown in full lines; the broken lines showing the position of the car body when moved from its loading position but before reaching its discharge position.

Fig. 3 is a view, similar to Fig. 2, showing the car in unloading position.

Figure 1:
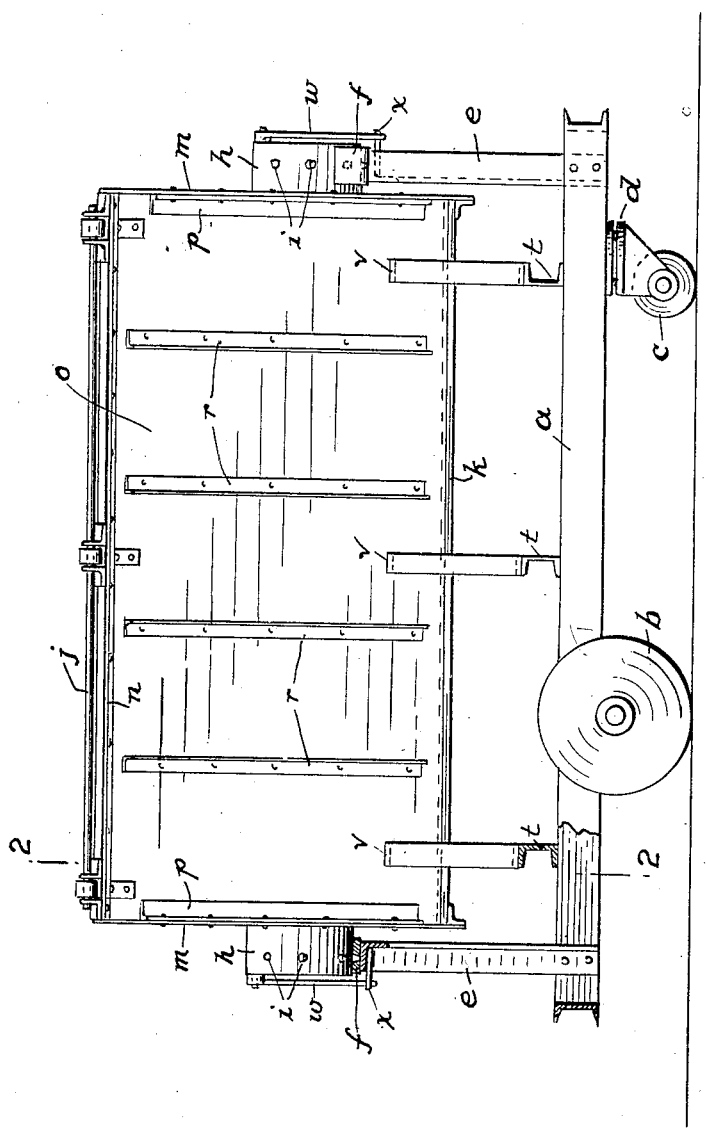
Figure 1 is a longitudinal view of the dump car.

The truck preferably comprises a truck body $a$, rear wheels $b$ mounted on an ordinary axle, and front wheels $c$ mounted on caster brackets $d$ turnable on a vertical axis. The wheels may be adapted to run on rails or on the ground.

At opposite ends of the truck are mounted frames $e$, each sustaining a transversely and horizontally extending rack $f$, the rack comprising a plate having spaced slots or orifices $g$, on which is rockable a segmental gear or rocker, which, preferably is an arc-shaped bar $h$ provided with teeth or projections $i$ adapted to engage the slots or orifices $g$ of the rack $f$.

The end plates $m$ of the car body are secured to and supported by the respective rockers $h$. These plates are of approximately triangular shape, the triangle being in an inverted position when the car body occupies the loaded position shown in full lines in Fig. 2. The lower ends of the end plates do not, however, taper to a point, but are provided with short lower edges which are connected by a long narrow floor or bottom $k$.

Corresponding upper corners of opposite end plates $m$ are connected together by ties $n$, on which are mounted longitudinal rods $j$ which form pintels for the hinged or pivoted side plates $o$ and $o'$ of the car body. These side plates converge downwardly, extending parallel to the side edges of the end plates. They rest against angle bars $p$ secured to the end plates $m$ and are stiffened by having secured thereto transversely extending angle bars $r$.

The car body bottom $k$ between the side plates $m$ is a flat bar, with its top longitudinal edges beveled off to form seats for the lower edges of the side plates $o$ and $o'$.

Mounted on beams $t$ secured to the truck across opposite sides thereof are two sets of members $v$, $v'$, performing the function both of abutments and cams, as will be explained. These two sets of members are so located as to be overhung by the respective side plates. The cam face of each member extends convexly upward and outward to act upon the side plates in the dumping of the car, as will be further explained.

The car body is normally maintained in its loading position by latches *w* pivoted to the rockers and engageable with pins *x* on the rack frame.

By disengaging the latches *w* from the pins *x* the car body is free to be swung, sidewise, in either direction, throughout an arc of about ninety degrees. After the car body is swung into such position that the side plate (for example, side plate *o*) from which the material is to be discharged reaches approximately a horizontal position, as shown in dotted lines in Fig. 2, the plate *o* contacts with the corresponding cam *v* and further movement of the car body causes the plate *o* to swing inwardly and upwardly, on its axis, until it assumes a more nearly vertical position, as indicated in Fig. 3. This insures the complete discharge of all the material.

In the restoration of the car body to normal position, the free end of the side plate *o* drops as rapidly as is permitted by cams *v* until it reaches the dotted line position shown in Fig. 2, after which it moves with the remainder of the car body.

Having now fully described my invention, what I claim and desire to protect by Letters Patent is:

1. In a dump car, the combination, with a truck, of a car body supported on the truck and swingable thereon sidewise, said body comprising a side pivoted at the upper part of the body; and a member adapted, in the swinging movement of the body, to engage the pivoted side and swing it toward an upright position, thereby facilitating and insuring the discharge of the material.

2. In a dump car, the combination, with a truck, and transversely extending racks thereon, of a car body, rockers secured to the car body and resting and swingable on the rack, said body comprising a side hinged at the upper part of the body, and a member carried by the truck and adapted, as the body and rocker swings on the rack toward said member, to engage the hinged side and swing it toward an upright position.

3. In a dump car, the combination, with a truck, of a car body supported on the truck and swingable thereon sidewise, said body comprising a side pivoted at the upper part of the body; and a cam carried by the truck outside the lower part of said pivoted side, said cam having an actuating face sloping convexly outward and adapted, as the body is swung sidewise, to engage the pivoted side and, as the body continues to swing, accelerate the swinging movement of said side relatively to the remainder of the body and thereby swing it inward relative to the car body and toward an upright position.

4. In a dump car, the combination, with a truck, of a car body comprising ends, and sides pivoted at the top between the ends and swingable inward; means supporting the body and permitting it to swing sidewise in either direction, and members supported on the truck on opposite sides of the lower part of the body, each member being positioned, when the body is swung toward it, to engage the side adjacent thereto and swing it upward and inward relative to the remainder of the body.

5. In a dump car, the combination, with a truck, of a car body comprising ends and sides, the ends being shaped to approximate inverted triangles, the sides converging from and pivotally supported at their tops between the ends, abutments carried by the truck and located on opposite sides of the body and overhung by the respective pivoted sides, and means supporting the body and allowing it to be swung sidewise in either direction, thereby causing the side over which the material is to be dumped to engage its corresponding abutment and be rocked thereby toward an upright position.

In testimony of which invention, I have hereunto set my hand, at Philadelphia, Pa., on this 9th day of January, 1920.

CHARLES M. WILSON.